UNITED STATES PATENT OFFICE 2,287,847

OXYGEN-EVOLVING SUBSTANCES

Thomas J. Webb, Plainfield, N. J., assignor to Merck & Co., Inc., Rahway, N. J., a corporation of New Jersey No Drawing. Application February 17, 1938, Serial No. 191,061

14 Claims. (Cl. 167—72)

This invention relates to oxygen-evolving preparations and to methods of increasing and controlling the oxygen evolution therefrom.

Certain oxygen-liberating compounds find application in therapy, because the oxygen as evolved is an efficient antiseptic. Among such compounds, zinc peroxide is especially important. This substance is used widely in the treatment of external skin afflictions, such as ulcers, serious wounds, anaerobic streptococcus wound infections, etc.

In order to be thoroughly effective, the zinc peroxide should preferably remain fluffy on the affected area, and should be made to decompose at such a rate that approximately twenty-five percent of its available oxygen is released over a twenty-four hour period. The more nearly uniform the release of the oxygen, the more effective the treatment.

According to recent findings of the medical profession, 5 grammes of zinc peroxide should release at least 12 cc. of oxygen during a twenty-four hour period, and during each hour the release of oxygen should be at least as great as 0.33 cc. These are minimum requirements, and it is a desideratum to have available a zinc peroxide preparation capable of even greater and more uniform evolution of oxygen.

The zinc peroxide, per se, now available on the market has many disadvantages. Many of those preparations tend to cake into a "cement" on the wounds, and in some cases it is practically impossible to remove them. This is associated with meagre evolution of oxygen, and therefore, increased and more uniform oxygen evolution is desirable in order to obviate caking, as well as for its antiseptic action.

Further, with many of the preparations now available, the oxygen evolved in a 24-hour period comprises only three percent or less of the theoretically available quantity. The best grades of commercial zinc peroxide contain approximately 45% $ZnO_2$. Under ordinary conditions, even the best of the available preparations releases considerably less than 10% of the theoretical quantity over a twenty-four-hour period. With almost all of the presently available preparations, there is a tendency toward an initial burst of oxygen during the first hour, followed by a decrease so marked that during the last hours of a twenty-four-hour period the minimum of 0.33 cc. per hour is barely met even under the most favorable conditions.

As it is, in order to meet the minimum requirements of the medical profession as to the amount and rate of oxygen evolution, it is necessary to pre-heat the zinc peroxide preparations now available on the market for at least four hours at a temperature of about 140° C. This temperature is extremely critical; temperatures below 140° C. are not effective, while temperatures above 140° C. result in decomposition and loss of oxygen. Great care is required in the pre-heating process in order to obtain a uniform material.

From the foregoing, it will be seen that zinc peroxide, as now available, possesses marked disadvantages which interfere with its most effective use in therapy.

I have now made a group of zinc peroxide preparations which avoid these disadvantages, are easily prepared for application, and which satisfy the requirements for medicinal use in every respect.

By means of my invention, it is possible for the first time to utilize as much as fifty percent or more of the total available oxygen contained in zinc peroxide. The evolution of the gas may be rendered substantially uniform, and it more than meets the minimum requirement for oxygen evolution over a prolonged period, even up to 72 hours of application under favorable conditions. Furthermore, these new preparations do not require the pre-heating step referred to above.

My invention resides in the discovery that ions of heavy metals having more than one well-defined valency series of compounds and a melting point within the range of 1060–1480° C. are catalysts for accelerating and controlling the release of oxygen from zinc peroxide in aqueous slurry, and that by appropriate adjustment of the relationship of the ions with respect to the zinc peroxide, as to relative concentrations, etc., as will hereinafter appear, the rate and amount of oxygen evolution may be effectively controlled for the purposes indicated.

Effective catalysts within the purview of my invention include manganous, cobaltous, cupric, and auric ions, derived from water soluble and ionizable compounds of the respective metals. Preferably, water-soluble salts of the metals may be employed, as, for instance, manganous sulfate, cupric sulfate, auric chloride, cobaltous sulfate, etc. However, any compound of the metal which yields the aforementioned ions in contact with water is serviceable.

The preparations of my invention may be prepared by intimate admixture of the catalysts with the zinc peroxide. They are suitable for application as dressings upon admixture with a sufficient amount of water to form a slurry.

In order to illustrate the manner in which the catalysts function to accelerate and control evolution of oxygen from the zinc peroxide, the following experimental data will be of service.

Table I below shows the results obtainable by adding varying quantities of manganous sulfate to the zinc peroxide. In practice, the mixture is made into a slurry, by the addition of water. For the purpose of the present exemplification, varying quantities of a tenth-molar solution of the catalyst were admixed with a slurry of 2 grams of zinc peroxide in about 20 cc. of water.

*Table I*

| Quantity of "catalyst" | ¼ hr. | 2 hrs. | 3 hrs. | 19 hrs. | 24 hrs. |
|---|---|---|---|---|---|
| | Cc. | Cc. | Cc. | Cc. | Cc. |
| 0 | 3.3 | 7.0 | 7.2 | 8.6 | 9.2 |
| 0.02 cc | 4.2 | 9.0 | 9.9 | 17.2 | 19.1 |
| 0.08 cc | 4.5 | 10.4 | 12.0 | 28.0 | 32.3 |
| 0.2 cc | 4.2 | 12.4 | 15.6 | 43.8 | 50.4 |
| 0.8 cc | 3.8 | 13.0 | 16.8 | 54.2 | 61.0 |
| 1.6 cc | 3.1 | 12.6 | 16.4 | 54.6 | 61.0 |

From the table, it will be seen that although the amount of oxygen released by the zinc peroxide without the catalyst in ¼ of an hour, for example, is not much less than that released by samples containing the catalyst over the same period, this includes an initial burst of oxygen, and represents about ⅓ of the total quantity released over a 24-hour period, whereas the oxygen evolved in ¼ hour by the zinc peroxide containing a catalyst in accordance with my invention represents only a small proportion of the total oxygen which thereafter is released more or less uniformly and continuously over the 24-hour period.

For the manganous sulfate illustrated in Table I, there may be substituted other compounds of other heavy metals of the type designated; any compound of these metals which will furnish ions in solution is suitable for use according to my invention. Thus, cupric sulphate, cobaltous sulphate, auric chloride, etc. may be employed, and act as catalysts on zinc peroxide for medicinal use to increase the oxygen evolution at least twofold over the uncatalyzed substance.

The selection of the specific catalytic compound will be governed by its suitability for medicinal purposes. Thus, for the manganese, copper, and cobalt, the method has been specifically illustrated in terms of the sulfate, whereas in the case of gold, the chloride is the most conveniently available compound. However, the action of the materials used depends upon the catalytic function of the metal ions as described, and therefore any appropriate water-soluble ionizable compound may be used, as will be obvious to those skilled in the art.

For purposes of comparison, several 2-gram samples of zinc peroxide, without catalyst, were made into a slurry with water and the oxygen evolution measured. The quantity of oxygen evolved over various periods is given in Table II, below:

*Table II*

| | 5 mins. | 16 hrs. | 24 hrs. | 40 hrs. | 47 hrs. |
|---|---|---|---|---|---|
| | Cc. | Cc. | Cc. | Cc. | Cc. |
| With 40 cc. $H_2O$ | 1.3 | 6.4 | 7.2 | 7.8 | 8.4 |
| With 20 cc. $H_2O$ | 2.5 | 7.2 | 7.8 | 9.0 | 9.0 |
| With 20 cc. $H_2O$ | 2.8 | 8.2 | 9.0 | 9.6 | 9.9 |
| With 20 cc. $H_2O$ | 2.4 | 7.4 | 8.2 | 9.0 | 9.3 |
| With 10 cc. $H_2O$ | 3.7 | 8.4 | 9.9 | 10.7 | 10.2 |

From a comparison of Tables I and II, it is apparent that when zinc peroxide for medicinal use is combined with a catalyst in accordance with my invention, the oxygen evolution is increased approximately 7-fold over the oxygen evolved from uncatalyzed zinc peroxide such as is now available.

Further, from Table I, it will be noted that, according to my invention, the rate of oxygen evolution may be controlled, within limits, by varying the concentration of the chosen catalyst. In terms of moles of catalyst per gram of zinc peroxide, manganous sulphate is approximately ten times as efficient in increasing the rate of oxygen evolution as cupric sulfate, cobaltous sulfate, or auric chloride. For the uses contemplated more particularly herein, the optimum range of concentration of manganous sulfate is from 0.01 to 0.50 cc. of tenth-molar $MnSO_4$ solution per gram of zinc peroxide. Stated in another way, it may be said that in order to control the oxygen evolution so that oxygen may be released in substantial excess of 0.33 cc. during each hour (from 5 grams of zinc peroxide) of a 24-hour period, the quantity of $MnSO_4$ should be approximately within the range from 0.015 to 0.75 gram per 100 grams of zinc peroxide.

The relatively less active catalysts can obviously be adjusted for adaptation to any given service requirements by appropriate increase in the amount of the catalyst to that of the zinc peroxide.

For practical purposes, the preparations contemplated herein comprise dry zinc peroxide and dry catalyst, which may be handled separately or in admixture. The dressings may be prepared extemporaneously by making a mixture of the zinc peroxide and catalyst into a slurry, or varying quantities of appropriate solutions of the catalyst may be added to make a slurry with the zinc peroxide.

The zinc peroxide best adapted for the medicinal use of oxygen in situ as referred to herein, is preferably prepared by reacting zinc chloride with sodium peroxide.

It has been found that the zinc peroxide thus prepared is more definitely responsive to the action of the catalyst for the purposes of this invention over that prepared, for instance, by the reaction of zinc oxide with hydrogen peroxide.

My invention is not limited to any precisely defined proportions, as it will be obvious to those skilled in the art, from the disclosures herein, that these may be adjusted within reasonably wide limits to meet varying, specific requirements, and I am not to be limited, therefore, in the interpretation of my disclosure except as broadly disclosed and as defined by the accompanying claims.

I claim as my invention:

1. The method of increasing and controlling the evolution of active oxygen from zinc peroxide which comprises subjecting such peroxide in contact with water to the action of ions of heavy metals having more than one well-defined valency series of compounds and melting within the range 1060–1480° C.

2. The method of increasing and controlling the evolution of active oxygen from zinc peroxide comprising the addition to such peroxide in contact with water of a soluble salt of a heavy metal having more than one well-defined valency series of compounds and melting within the range of 1060–1480° C.

3. The method of increasing and controlling the evolution of active oxygen from zinc peroxide comprising subjecting such peroxide in contact with water to the action of ions derived from a soluble salt of a heavy metal having more than one well-defined valency series of compounds and melting within the range of 1060–1480° C., said metal salt being in amount sufficient to effect substantially uniform decomposition of the peroxide at such a rate as to release at least 0.33 cc. of oxygen per hour from 5 grams of zinc peroxide for every hour of a 24-hour period.

4. A dry pulverulent composition comprising zinc peroxide and a soluble ionizable compound of a heavy metal having more than one well-defined valency series of compounds and melting within the range of 1060–1480° C.

5. A dry pulverulent preparation comprising zinc peroxide and a soluble ionizable compound of a heavy metal having more than one well-defined valency series of compounds and melting within the range of 1060–1480° C., said soluble metal compound being present in such amount that when the preparation is in contact with water the peroxide is decomposed at such a rate that at least 0.33 cc. of active oxygen is evolved per hour from 5 grams of zinc peroxide, for every hour of a 24-hour period.

6. A preparation comprising zinc peroxide and an oxygen-evolving catalyst in the form of a water-soluble ionizable compound of manganese.

7. A preparation comprising zinc peroxide and an oxygen-evolving catalyst in the form of a water-soluble ionizable compound of copper.

8. A preparation comprising zinc peroxide and an oxygen-evolving catalyst in the form of a water-soluble ionizable compound of cobalt.

9. A composition of matter comprising an aqueous slurry of zinc peroxide with a soluble ionizable compound of a heavy metal having more than one well-defined valency series of compounds and melting within the range of 1060–1480° C.

10. As a new composition of matter, suitable for medicinal use, an aqueous slurry comprising zinc peroxide and a catalyst consisting of manganous sulfate.

11. As a new composition of matter, suitable for medicinal use, an aqueous slurry comprising zinc peroxide and a catalyst consisting of cobaltous sulfate.

12. As a new composition of matter, suitable for medicinal use, an aqueous slurry comprising zinc peroxide and a catalyst consisting of cupric sulfate.

13. A preparation comprising zinc peroxide and manganous sulfate in the proportions of from about 0.015 to 0.75 gms. of manganous sulfate to about 100 gms. of zinc peroxide.

14. As a new composition of matter, suitable for medicinal use, an aqueous slurry comprising zinc peroxide and manganous sulfate in the proportions of from about 0.015 to 0.75 gms. of manganous sulfate to about 100 gms. of zinc peroxide.

THOMAS J. WEBB.